United States Patent
Shiba

(10) Patent No.: US 9,559,783 B2
(45) Date of Patent: Jan. 31, 2017

(54) OPTICAL RECEIVER AND METHOD FOR CONTROLLING OPTICAL RECEIVER, OPTICAL RECEIVER, METHOD FOR CONTROLLING OPTICAL RECEIVER, AND METHOD FOR RECEIVING LIGHT

(71) Applicant: Kazuhiro Shiba, Tokyo (JP)

(72) Inventor: Kazuhiro Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 14/372,583

(22) PCT Filed: Jan. 21, 2013

(86) PCT No.: PCT/JP2013/000256
§ 371 (c)(1),
(2) Date: Jul. 16, 2014

(87) PCT Pub. No.: WO2013/111555
PCT Pub. Date: Aug. 1, 2013

(65) Prior Publication Data
US 2014/0376930 A1    Dec. 25, 2014

(30) Foreign Application Priority Data
Jan. 23, 2012  (JP) ................................ 2012-011230

(51) Int. Cl.
*H04B 10/00*  (2013.01)
*H04B 10/61*  (2013.01)
(Continued)

(52) U.S. Cl.
CPC ........ *H04B 10/616* (2013.01); *H04B 10/2575* (2013.01); *H04B 10/61* (2013.01); *H04B 10/671* (2013.01); *H04B 10/691* (2013.01)

(58) Field of Classification Search
CPC . H04B 10/616; H04B 10/2575; H04B 10/671; H04B 10/691; H04B 10/61
See application file for complete search history.

(56) References Cited

U.S. PATENT DOCUMENTS 7,636,525 B1 * 12/2009 Bontu .................... H04B 10/60
398/208
8,805,193 B2 * 8/2014 Forster ............... H05B 37/0272
340/13.26

(Continued)

FOREIGN PATENT DOCUMENTS

JP         2-36622 A      2/1990
JP      2011-193347 A     9/2011

OTHER PUBLICATIONS

International Search Report (ISR) (PCT Form PCT/ISA/210), in PCT/JP2013/000256, dated Mar. 19, 2013.

*Primary Examiner* — Danny Leung
(74) *Attorney, Agent, or Firm* — McGinn IP Law Group, PLLC

(57) ABSTRACT

In an optical receiver which is compatible with a plurality of signal channels, it is difficult to receive signals properly because a variation in receiving light sensitivity of a photoelectric conversion unit occurs between a plurality of signal channels, therefore, an optical receiver according to an exemplary aspect of the invention includes an optical processing circuit processing input signal light to have been input and outputting a plurality of output signal light beams; and a plurality of photoelectric conversion means for receiving the plurality of output signal light beams respectively and outputting electric signals, wherein the photoelectric conversion means includes an avalanche photodiode which can control a multiplication factor of an output current as the electric signal by means of an applied voltage; and the avalanche photodiode operates with a driving voltage by (Continued)

which the output currents in the plurality of photoelectric conversion means become almost the same.

18 Claims, 3 Drawing Sheets

(51) Int. Cl.
*H04B 10/67* (2013.01)
*H04B 10/69* (2013.01)
*H04B 10/2575* (2013.01)

(56) References Cited

U.S. PATENT DOCUMENTS

| | | | |
|---|---|---|---|
| 8,983,308 B2* | 3/2015 | Biegert | H04B 10/66 398/202 |
| 2004/0086283 A1* | 5/2004 | Paoli | H04B 10/1121 398/212 |
| 2005/0100350 A1* | 5/2005 | Nagakubo | H04B 10/695 398/208 |
| 2008/0013964 A1* | 1/2008 | Noheji | H04B 10/66 398/202 |
| 2008/0038001 A1* | 2/2008 | Becker | H04B 10/616 398/204 |
| 2008/0138092 A1* | 6/2008 | Nagakubo | H04B 10/6911 398/202 |
| 2008/0205906 A1* | 8/2008 | Murata | H04B 10/6931 398/208 |
| 2010/0054758 A1* | 3/2010 | Ereifej | H04B 10/296 398/202 |
| 2013/0084079 A1* | 4/2013 | Nordholt | H04K 1/08 398/184 |
| 2014/0376930 A1* | 12/2014 | Shiba | H04B 10/671 398/212 |

* cited by examiner

OPTICAL RECEIVER AND METHOD FOR CONTROLLING OPTICAL RECEIVER, OPTICAL RECEIVER, METHOD FOR CONTROLLING OPTICAL RECEIVER, AND METHOD FOR RECEIVING LIGHT

TECHNICAL FIELD

The present invention relates to optical receivers, methods for controlling an optical receiver, and methods for receiving light, in particular, to an optical receiver, a method for controlling an optical receiver, and a method for receiving light which are compatible with a plurality of signal channels.

BACKGROUND ART

The backbone transmission system is required to further increase its capacity with the amount of information (traffic) in the Internet increasing. The technology for increasing the capacity includes an optical transmission technology using a plurality of channels such as an optical multilevel modulation system and a polarization multiplexing system. It has become more important to improve receiving sensitivity with the capacity increasing, and a coherent optical transmission technology in which the receiving sensitivity is very high has received a lot of attention. In the coherent optical transmission technology, AC (Alternating Current) signal components are received which have been amplified by mixing signal light and local oscillator (LO) light in a coherent optical receiver. At that time, the larger amplifying action works on the signal light as the optical output of the local oscillation (LO) light becomes larger, and therefore receiving characteristics with a high S/N (Signal/Noise) ratio can be obtained by inputting the larger local oscillation (LO) light compared to the signal light.

Patent literature 1 describes an example of such a coherent optical receiver compatible with a plurality of channels. A coherent optical receiver described in patent literature 1 includes an optical signal processing unit performing signal processing on input optical signals, separating the signals and outputting separated signals from a plurality of output ports; and a photoelectric conversion unit performing photoelectric conversion on the optical signal output from each output port and outputting the result. It further includes a plurality of output terminals having a space wider than a space between output sections of the photoelectric conversion unit; and an electric wiring unit connecting a plurality of electric signals output from the photoelectric conversion unit to a plurality of output terminals. Here, the photoelectric conversion unit is separated into a plurality of units and disposed on the center line of an output terminal of a connection destination. The optical signal processing unit has an optical expansion section where optical wiring is laid so as to be photo-coupled to photoelectric conversion units where the outputs from the plurality of output ports are separated into a plurality of ports and arranged.

The configuration enables the photoelectric conversion unit disposed separately to be disposed so that the distance to the output terminal may become shorter. They say, therefore, that it becomes possible to suppress the deterioration of output electric signal levels of the related coherent optical receiver having multi-channel outputs.

CITATION LIST

Patent Literature

Patent Literature 1: Japanese Patent Application Laid-Open Publication No. 2011-193347 (paragraphs [0011] to [0055])

DISCLOSURE OF INVENTION

Problem to be Solved by the Invention

It is necessary that an optical receiver used for a coherent optical transmission system such as the above-mentioned related coherent optical receiver should receive the output signal light output from a plurality of output ports with equivalent efficiency. The variation in receiving light sensitivity, however, occurs in the related coherent optical receiver because the coupling efficiency of each photoelectric conversion unit differs due to a slight mounting error in disposing a photoelectric conversion unit. In particular, a photodiode used in the related photoelectric conversion unit has a very narrow receiving light area in order to meet a high-speed communication, and therefore, the influence is remarkable.

As mentioned above, there is a problem that in a related optical receiver, it is difficult to receive signals properly because a variation in receiving light sensitivity of a photoelectric conversion unit occurs between a plurality of signal channels.

The object of the present invention is to provide an optical receiver, a method for controlling an optical receiver, and a method for receiving light which solve the problem mentioned above that in a related optical receiver, it is difficult to receive signals properly because a variation in receiving light sensitivity of a photoelectric conversion unit occurs between a plurality of signal channels.

Means for Solving a Problem

An optical receiver according to an exemplary aspect of the invention includes an optical processing circuit processing input signal light to have been input and outputting a plurality of output signal light beams; and a plurality of photoelectric conversion means for receiving the plurality of output signal light beams respectively and outputting electric signals, wherein the photoelectric conversion means includes an avalanche photodiode which can control a multiplication factor of an output current as the electric signal by means of an applied voltage; and the avalanche photodiode operates with a driving voltage by which the output currents in the plurality of photoelectric conversion means become almost the same.

A method for controlling an optical receiver according to an exemplary aspect of the invention includes the steps of: for an optical receiver including an optical processing circuit processing input signal light to have been input and outputting a plurality of output signal light beams; and a plurality of photoelectric conversion means for receiving the plurality of output signal light beams respectively and outputting electric signals, wherein the photoelectric conversion means includes an avalanche photodiode which can control a multiplication factor of an output current as the electric signal by means of an applied voltage, controlling the applied voltage so that the output currents of the avalanche photodiodes in the plurality of photoelectric conversion means may become almost the same.

A method for receiving light according to an exemplary aspect of the invention includes the steps of: processing input signal light to have been input and outputting a plurality of output signal light beams; receiving the plurality of output signal light beams respectively and outputting an electric signal; and controlling a multiplication factor of the electric signal so that the electric signals for the plurality of output signal light beams may become almost the same.

Effect of the Invention

According to an optical receiver, a method for controlling an optical receiver, and a method for receiving light of the present invention, it becomes possible to receive signals properly even in a case for a plurality of signal channels.

DESCRIPTION OF EMBODIMENTS

The exemplary embodiments of the present invention will be described with reference to drawings below.

The First Exemplary Embodiment

Figure 1:
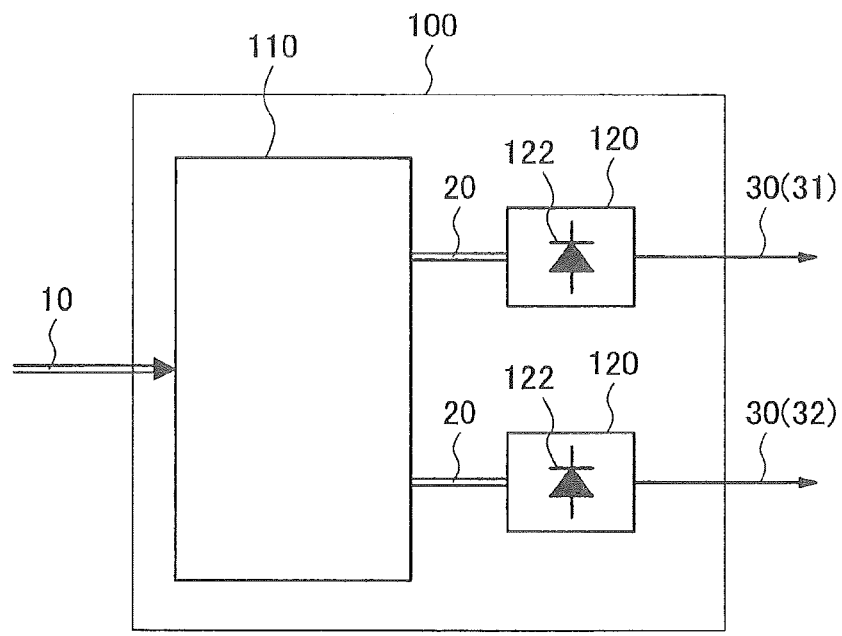
FIG. 1 is a block diagram illustrating a configuration of an optical receiver in accordance with the first exemplary embodiment of the present invention.

FIG. 1 is a block diagram illustrating a configuration of an optical receiver 100 in accordance with the first exemplary embodiment of the present invention. The optical receiver 100 includes an optical processing circuit 110 processing input signal light 10 to have been input and outputting a plurality of output signal light beams 20, and a plurality of photoelectric conversion units 120 receiving the plurality of output signal light beams 20 respectively and outputting electric signals 30. The photoelectric conversion unit 120 includes an avalanche photodiode 122 which can control a multiplication factor of an output current as the electric signal 30 by means of an applied voltage. In the optical receiver 100, the avalanche photodiode 122 operates with a driving voltage by which respective output currents 31 and 32 in the plurality of photoelectric conversion units 120 become almost the same.

An avalanche photodiode (Avalanche PhotoDiode: APD) is a photodiode which has an internal gain and has a function to amplify electrons converted photoelectrically by utilizing an avalanche phenomenon. Here, the avalanche phenomenon is a phenomenon that occurs in a chain reaction that generated electrons and holes are accelerated by a voltage and collide with atoms located in a lattice, secondary electrons and holes are generated by the collision, and these are accelerated by a voltage and further generate electron-hole pairs. A multiplication factor of an avalanche photodiode is defined as the ratio of a photocurrent in applying a reverse bias voltage to a photocurrent when a multiplication does not occur because a reverse bias voltage as an applied voltage is small.

As mentioned above, the avalanche photodiode has an internal gain and can control the gain by means of a voltage to be applied (applied voltage). Specifically, for example, if an avalanche photodiode with a punch through voltage equal to 15 V and a breakdown voltage equal to 30 V is used, the output current can be increased by making a voltage applied to the avalanche photodiode vary from 17V to 19V, for example.

In the optical receiver 100, there is a possibility that the output signal light beam 20 to be input into the photoelectric conversion unit 120 varies between a plurality of signal channels because of the difference in loss within the optical processing circuit 110, and a decrease in the coupling efficiency due to a mounting position gap between the optical processing circuit 110 and the photoelectric conversion unit 120 and the like. The photoelectric conversion unit 120 in the optical receiver 100 of the present exemplary embodiment, however, is configured to include the avalanche photodiode 122 which can control a multiplication factor of an output current by means of an applied voltage. It is possible, therefore, to adjust an output current in each signal channel independently. The avalanche photodiode 122 is configured to operate on a driving voltage by which the respective output currents 31 and 32 in a plurality of photoelectric conversion units 120 become almost the same. As mentioned above, according to the optical receiver 100 of the present exemplary embodiment, since almost the same output current can be obtained even if there occurs a variation among the output signal light beams 20 in a plurality of signal channels, it becomes possible to receive signals properly.

Specifically, for example, an avalanche photodiode disposed in a signal channel where the coupling efficiency has decreased due to a mounting position gap or the like is configured to operate on a higher applied voltage than that of an avalanche photodiode disposed in a signal channel where a mounting position gap has not occurred. Since the configuration enables the decrease in the output signal light beam 20 to be compensated by increasing a multiplication factor of an avalanche photodiode, it is possible to correct a variation of the receiving light sensitivity between a plurality of signal channels and to realize a higher receiving light sensitivity simultaneously.

The optical receiver 100 can be configured in which a multiplication factor determined by a driving voltage of the avalanche photodiode 122 falls within the range where the frequency characteristics of the avalanche photodiode 122 become nearly constant relative to a change in a multiplication factor. In addition, the optical receiver 100 can be configured in which a driving voltage of the avalanche photodiode 122 falls within the range where the frequency characteristics of the avalanche photodiode 122 become an operating state limited by a time constant dependent on the capacitance value and the resistance value of the avalanche photodiode 122.

By adopting such configuration, it is possible to obtain the optical receiver 100 which has high speed response characteristics that are uniform between a plurality of signal channels. Next, the above-mentioned configuration will be described in more detail.

The frequency characteristics of a light receiving element are generally determined by the product (CR) of the element capacitance (C) and element resistance (R), and a carrier transit time. With regard to a PIN photodiode (PIN-PD), the element capacitance, the element resistance, and the carrier transit time depend only on a device structure, and these values do not vary even if an applied voltage is changed.

Figure 2:
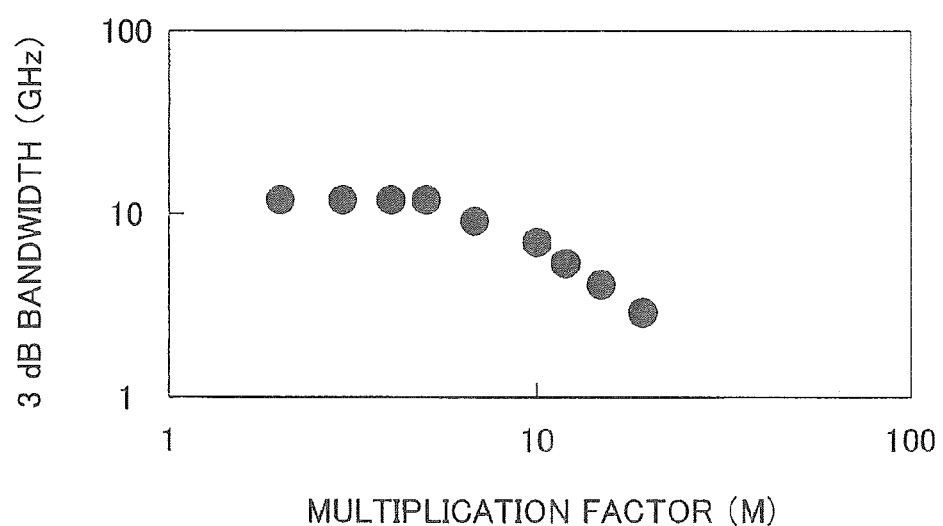
FIG. 2 is a diagram illustrating the results obtained by calculating the dependence of 3 dB bandwidth of an avalanche photodiode on multiplication factors.

On the other hand, with regard to an avalanche photodiode (APD), the frequency characteristics have the gain dependence. FIG. 2 illustrates an example of the results obtained by calculating the dependence of 3 dB bandwidth of an avalanche photodiode on multiplication factors. It can be seen from the figure that 3 dB bandwidth in an avalanche photodiode decreases as a multiplication factor (M) becomes larger. The reason is that high speed response characteristics decrease in a high multiplication area where a multiplication factor (M) is larger because the carrier transit time in a multiplication layer becomes longer.

It is possible to suppress the dependence of frequency characteristics on the gain because the carrier transit time has small influence on frequency characteristics in a low multiplication area. By adopting a structure in which the frequency characteristics of an avalanche photodiode is limited by a time constant determined by the product of the element capacitance and resistance, it is possible to make the variation with the multiplication factor of frequency characteristics smaller. As mentioned above, according to the optical receiver 100 of the present exemplary embodiment, it becomes possible to equalize receiving light sensitivities with high speed response characteristics between a plurality of signal channels made uniform.

Next, a method for controlling the optical receiver 100 of the present exemplary embodiment will be described. In a method for controlling the optical receiver 100 of the present exemplary embodiment, applied voltages are controlled for the optical receiver 100 so that respective output currents of avalanche photodiodes 122 in a plurality of photoelectric conversion units 120 may become almost the same. As mentioned above, the configuration of the optical receiver 100 is a configuration to include the optical processing circuit 110 processing the input signal light 10 to have been input and outputting a plurality of output signal light beams 20, and a plurality of photoelectric conversion units 120 receiving the plurality of output signal light beams 20 respectively and outputting the electric signals 30. The photoelectric conversion unit 120 includes the avalanche photodiode 122 which can control a multiplication factor of an output current as the electric signal 30 by means of an applied voltage. In the method for controlling the optical receiver 100 of the present exemplary embodiment, it is also acceptable to control an applied voltage so that a multiplication factor determined by an applied voltage may fall within the range where the frequency characteristics of the avalanche photodiode 122 become nearly constant relative to a change in a multiplication factor.

Next, a method for receiving light in accordance with the present exemplary embodiment will be described. A method for receiving light in accordance with the present exemplary embodiment includes processing input signal light to have been input and outputting a plurality of output signal light beams, and receiving the plurality of output signal light beams respectively and outputting electric signals. A multiplication factor of an electric signal is controlled so that respective electric signals for the plurality of output signal light beams may become almost the same. At that time, it is also acceptable to control a multiplication factor so that a multiplication factor may fall within the range where the frequency characteristics of electric signals relative to a change in the multiplication factor become nearly constant.

The Second Exemplary Embodiment

Figure 3:
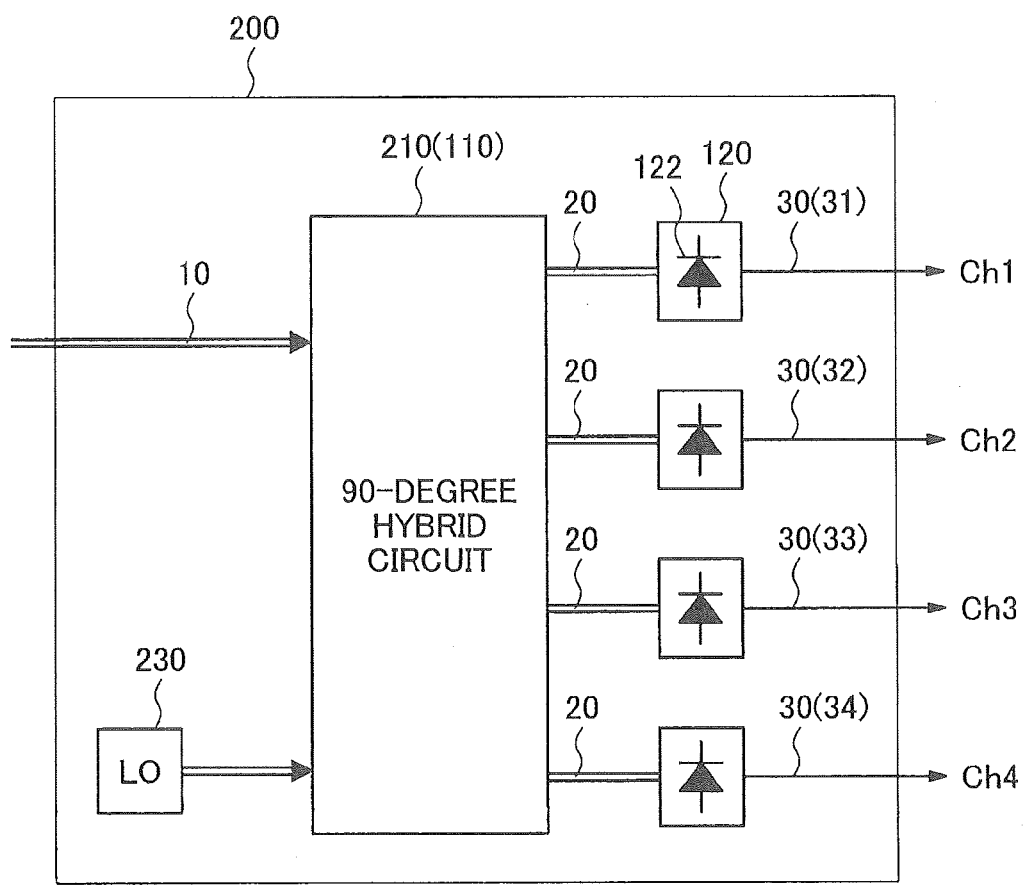
FIG. 3 is a block diagram illustrating a configuration of an optical receiver in accordance with the second exemplary embodiment of the present invention.

Next, the second exemplary embodiment of the present invention will be described. FIG. 3 is a block diagram illustrating a configuration of an optical receiver 200 in accordance with the second exemplary embodiment of the present invention. The optical receiver 200 includes an optical processing circuit 110 processing input signal light 10 to have been input and outputting a plurality of output signal light beams 20, and a plurality of photoelectric conversion units 120 receiving the plurality of output signal light beams 20 respectively and outputting electric signals 30. The photoelectric conversion unit 120 includes an avalanche photodiode 122 which can control a multiplication factor of an output current as the electric signal 30 by means of an applied voltage. In the optical receiver 200, the avalanche photodiode 122 operates with a driving voltage by which respective output currents 31 to 34 in the plurality of photoelectric conversion units 120 become almost the same.

The above-mentioned configuration is similar to that of the optical receiver 100 in the first exemplary embodiment. The optical receiver 200 in the present exemplary embodiment further includes a local oscillation light source (LO) 230 connected to the optical processing circuit 110. The optical processing circuit 110 includes a 90-degree hybrid circuit 210 into which local oscillation light from the local oscillation light source (LO) 230 and the input signal light 10 are input. Here, the input signal light 10 is a phase modulation signal, and the optical receiver 200 outputs the electric signal 30 obtained by performing coherent detection on the phase modulation signal.

Next, the configuration of the optical receiver 200 in the present exemplary embodiment will be described in more detail. The 90-degree hybrid circuit 210 mixes the input signal light 10 and the local oscillation light, and outputs the output signal light beam 20 to each port. The 90-degree hybrid circuit 210 can be configured by a planar lightwave circuit (PLC) composed of an optical waveguide, for example.

The output signal light beams 20 from the 90-degree hybrid circuit 210 are received by a plurality of photoelectric conversion units 120. At that time, it is also acceptable for two pieces of avalanche photodiodes 122 included by each of the plurality of photoelectric conversion units 120 to compose a balanced receiver. A balanced receiver is composed of two photodiodes which receive the normal phase signal light and the reversed phase signal light output from a 90-degree hybrid circuit, and is a receiving system in which the receiving characteristics are improved by utilizing a difference between electric currents of those photodiodes. Specifically, a balanced receiver can be composed of channel 1 (Ch1) and channel 2 (Ch2) as well as channel 3 (Ch3) and channel 4 (Ch4), which are shown in FIG. 3, respectively.

Here, it is necessary that the receiving light sensitivity and the frequency characteristics of respective avalanche photodiodes 122 in respective channels should be uniform. There is a possibility, however, that the output signal light beam 20 to be input into the photoelectric conversion unit 120 varies between a plurality of signal channels because of the difference in loss within the 90-degree hybrid circuit 210, and a decrease in the coupling efficiency due to a mounting position gap between the 90-degree hybrid circuit 210 and the photoelectric conversion unit 120 and the like. Even in such case, according to the optical receiver 200 in the present exemplary embodiment, it is possible to realize the uniformity in receiving light sensitivity and frequency characteristics between respective channels, as described below.

In the optical receiver 200 of the present exemplary embodiment, the photoelectric conversion unit 120 is configured to include the avalanche photodiode 122 which can control the multiplication factor of the output current by means of the applied voltage. It is possible, therefore, to adjust the output current in each signal channel independently, and to correct a difference between output currents 31 to 34 caused by the variation of output signal light beams 20 by using the gain of the avalanche photodiode 122.

Specifically, for example, if the local oscillation light of 1 mW is input into the 90-degree hybrid circuit 210 and the multiplication factor of the avalanche photodiode 122 is equal to "1", it is assumed that output currents in respective signal channels are as follows. That is to say, it is assumed that the output current is equal to 0.1 mA in channel 1 (Ch1), 0.05 mA in channel 2 (Ch2), 0.06 mA in channel 3 (Ch3), and 0.08 mA in channel 4 (Ch4). At that time, the driving voltages of the avalanche photodiodes 122 are set as follows, respectively. That is, the driving voltage is set for channel 1 (Ch1) so that the multiplication factor may become equal to "2", and the driving voltage is set for channel 2 (Ch2) so that the multiplication factor may become equal to "4". Also, the driving voltage is set for channel 3 (Ch3) so that the multiplication factor may become equal to "3.2" and the driving voltage is set for channel 4 (Ch4) so that the multiplication factor may become equal to "2.5", respectively. As a result, it is possible to make the output currents in respective signal channels equal to 0.2 mA uniformly.

As mentioned above, according to the optical receiver 200 of the present exemplary embodiment, since almost the same output current can be obtained even if there occurs a variation among the output signal light beams 20 in a plurality of signal channels, it becomes possible to receive signals properly.

The optical receiver 200 can be configured in which a multiplication factor determined by a driving voltage of the avalanche photodiode 122 falls within the range where the frequency characteristics of the avalanche photodiode 122 becomes nearly constant relative to a change in a multiplication factor. In addition, the optical receiver 200 can be configured in which a driving voltage of the avalanche photodiode 122 falls within the range where the frequency characteristics of the avalanche photodiode 122 becomes an operating state limited by a time constant dependent on the capacitance value and the resistance value of the avalanche photodiode 122. By adopting such configuration, as described in the first exemplary embodiment, it is possible to obtain the optical receiver 200 which has high speed response characteristics that are uniform between a plurality of signal channels.

Figure 4:
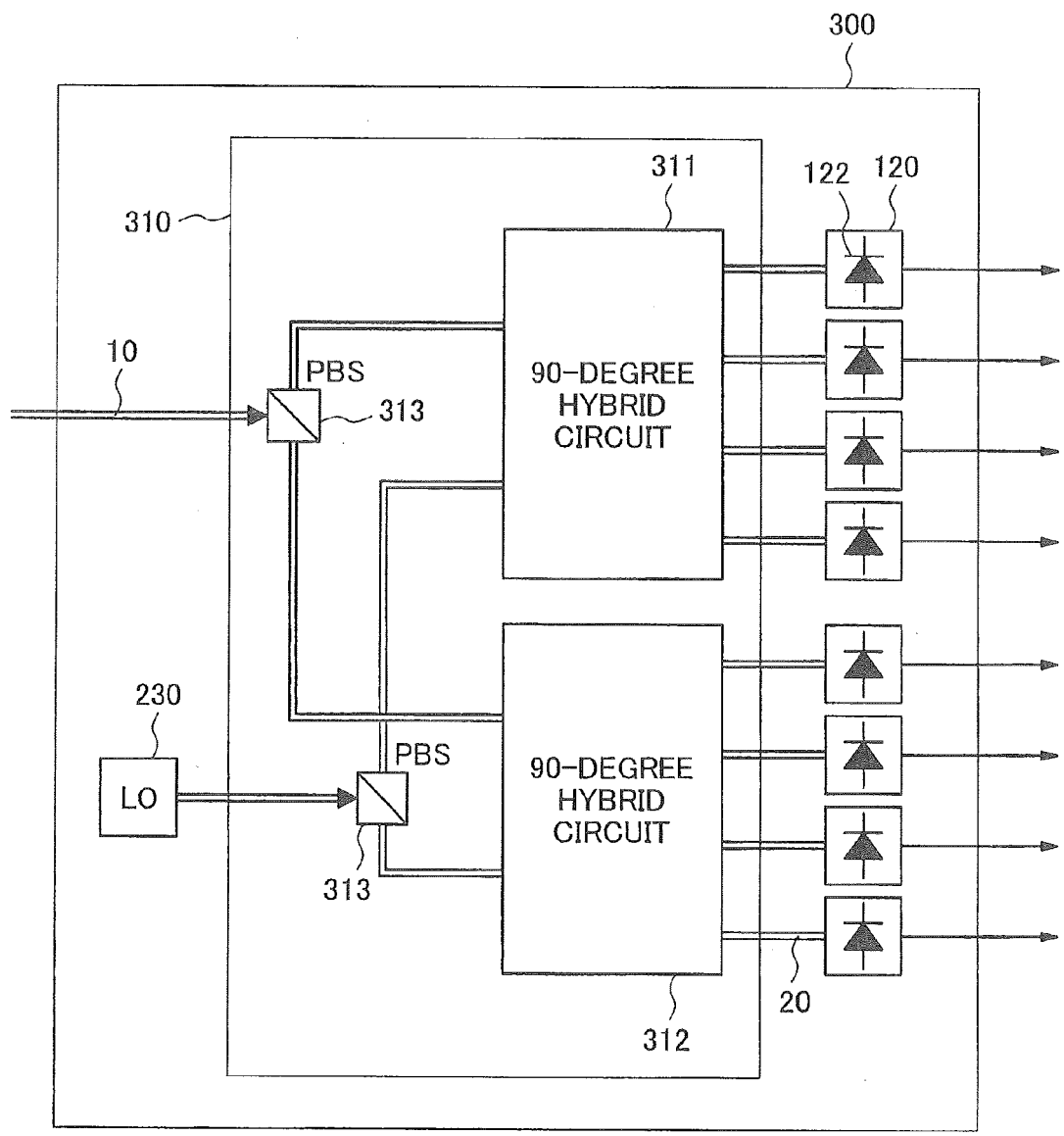
FIG. 4 is a block diagram illustrating another configuration of an optical receiver in accordance with the second exemplary embodiment of the present invention.

In the present exemplary embodiment, a case has been described in which the optical processing circuit 110 in the optical receiver 200 includes a single 90-degree hybrid circuit 210, and the input signal light 10 is a phase modulation signal. It is not limited to this, however, it is also acceptable that the optical processing circuit includes two 90-degree hybrid circuits, and the input signal light is a polarization-multiplexed phase modulation signal. FIG. 4 illustrates a configuration of an optical receiver 300 described above. An optical processing circuit 310 in the optical receiver 300 includes two 90-degree hybrid circuits 311 and 312. In addition, the optical processing circuit 310 includes polarization beam splitters (PBS) 313 in the side of the input signal light 10 and in the side of the local oscillation light source (LO) 230, respectively.

The polarization-multiplexed phase modulation signal as the input signal light 10 is split into two polarization light beams by the polarization beam splitter (PBS) 313, and these are input into the 90-degree hybrid circuits 311 and 312, respectively. In the 90-degree hybrid circuits 311 and 312, the phase modulation signal is separated into an in-phase component (I) and a quadrature component (Q) respectively, each of which is input into the avalanche photodiode 122 which each photoelectric conversion unit 120 includes. As mentioned above, according to the optical receiver 300, since almost the same output current can be obtained even if there occurs a variation among the output signal light beams 20 in a plurality of signal channels, it becomes possible to receive signals properly.

The present invention is not limited to the above-mentioned exemplary embodiments and can be variously modified within the scope of the invention described in the claims. It goes without saying that these modifications are also included in the scope of the present invention.

This application is based upon and claims the benefit of priority from Japanese Patent Application No. 2012-011230, filed on Jan. 23, 2012, the disclosure of which is incorporated herein in its entirety by reference.

DESCRIPTION OF THE CODES 100, 200, 300 optical receiver
110, 310 optical processing circuit
120 photoelectric conversion unit
122 avalanche photodiode
210, 311, 312 90-degree hybrid circuit
230 local oscillation light source (LO)
313 polarization beam splitter (PBS)
10 input optical signal
20 output signal light beam
30 electric signal
31, 32, 33, 34 output current

The invention claimed is:
1. An optical receiver, comprising:
an optical processing circuit processing input signal light having been input and outputting a plurality of output signal light beams; and
a plurality of photoelectric conversion units receiving the plurality of output signal light beams respectively and outputting electric signals,
wherein the photoelectric conversion unit comprises an avalanche photodiode which can control a multiplication factor of an output current as the electric signal by an applied voltage; and
the avalanche photodiode performs a multiplying operation with a driving voltage by which the output currents in the plurality of photoelectric conversion units become almost the same.
2. The optical receiver according to claim 1,
wherein the multiplication factor determined by the driving voltage falls within a range where frequency characteristics of the avalanche photodiode become nearly constant relative to a change in the multiplication factor.
3. The optical receiver according to claim 1,
wherein the driving voltage falls within a range where frequency characteristics of the avalanche photodiode become an operating state limited by a time constant dependent on a capacitance value and a resistance value of the avalanche photodiode.
4. The optical receiver according to claim 1,
wherein two pieces of the avalanche photodiodes comprised by each of the plurality of photoelectric conversion units compose a balanced receiver.

5. The optical receiver according to claim 1, further comprising a local oscillation light source connected to the optical processing circuit,
wherein the optical processing circuit comprises a 90-degree hybrid circuit into which local oscillation light from the local oscillation light source and the input signal light are input; and
the input signal light comprises a phase modulation signal, and an electric signal obtained by performing coherent detection on the phase modulation signal is output.

6. The optical receiver according to claim 5,
wherein the optical processing circuit comprises two pieces of the 90-degree hybrid circuit; and
the input optical signal comprises a polarization-multiplexed phase modulation signal.

7. A method for controlling an optical receiver, comprising:
for an optical receiver comprising an optical processing circuit processing input signal light having been input and outputting a plurality of output signal light beams; and a plurality of photoelectric conversion units receiving the plurality of output signal light beams respectively and outputting electric signals, wherein the photoelectric conversion unit comprises an avalanche photodiode which can control a multiplication factor of an output current as the electric signal by an applied voltage,
controlling the applied voltage so that the output currents of the avalanche photodiodes in the plurality of photoelectric conversion units may become almost the same by multiplying operations of the avalanche photodiodes.

8. The method for controlling an optical receiver according to claim 7,
wherein the applied voltage is controlled so that the multiplication factor determined by the applied voltage may fall within a range where frequency characteristics of the avalanche photodiode become nearly constant relative to a change in the multiplication factor.

9. A method for receiving light, comprising:
processing input signal light having been input and outputting a plurality of output signal light beams;
receiving the plurality of output signal light beams respectively and outputting an electric signal; and
controlling a multiplication factor of the electric signal so that the electric signals for the plurality of output signal light beams may become almost the same by multiplying operations.

10. The method for receiving light according to claim 9, wherein the multiplication factor is controlled so that the multiplication factor may fall within a range where frequency characteristics of the electric signal relative to a change in the multiplication factor become nearly constant.

11. The optical receiver according to claim 2,
wherein two pieces of the avalanche photodiodes comprised by each of the plurality of photoelectric conversion units compose a balanced receiver.

12. The optical receiver according to claim 3,
wherein two pieces of the avalanche photodiodes comprised by each of the plurality of photoelectric conversion units compose a balanced receiver.

13. The optical receiver according to claim 2, further comprising a local oscillation light source connected to the optical processing circuit,
wherein the optical processing circuit comprises a 90-degree hybrid circuit into which local oscillation light from the local oscillation light source and the input signal light are input; and
the input signal light comprises a phase modulation signal, and an electric signal obtained by performing coherent detection on the phase modulation signal is output.

14. The optical receiver according to claim 3, further comprising a local oscillation light source connected to the optical processing circuit,
wherein the optical processing circuit comprises a 90-degree hybrid circuit into which local oscillation light from the local oscillation light source and the input signal light are input; and
the input signal light comprises a phase modulation signal, and an electric signal obtained by performing coherent detection on the phase modulation signal is output.

15. The optical receiver according to claim 4, further comprising a local oscillation light source connected to the optical processing circuit,
wherein the optical processing circuit comprises a 90-degree hybrid circuit into which local oscillation light from the local oscillation light source and the input signal light are input; and
the input signal light comprises a phase modulation signal, and an electric signal obtained by performing coherent detection on the phase modulation signal is output.

16. The optical receiver according to claim 1, wherein the avalanche photodiode which controls the multiplication factor of the output current as the electric signal by the applied voltage, thereby to adjust the output currents in each signal channel independently.

17. The optical receiver according to claim 1, wherein the multiplication factor determined by the driving voltage is within a range where frequency characteristics of the avalanche photodiode are constant.

18. The optical receiver according to claim 1, wherein the optical receiver comprises response characteristics that are uniform between a plurality of signal channels.

* * * * *